US 8,521,858 B2

(12) United States Patent
Shaikh et al.

(10) Patent No.: US 8,521,858 B2
(45) Date of Patent: Aug. 27, 2013

(54) SELECTION OF A POLICY AND CHARGING RULES FUNCTION DEVICE

(75) Inventors: Imtiyaz Shaikh, Irving, TX (US);
Priscilla Lau, Fremont, CA (US)

(73) Assignee: Verizon Patent Licensing Inc., Basking Ridge, NJ (US)

( * ) Notice: Subject to any disclaimer, the term of this patent is extended or adjusted under 35 U.S.C. 154(b) by 304 days.

(21) Appl. No.: 12/795,128

(22) Filed: Jun. 7, 2010

(65) Prior Publication Data

US 2011/0302289 A1 Dec. 8, 2011

(51) Int. Cl.
*G06F 15/16* (2006.01)
*G06F 15/173* (2006.01)

(52) U.S. Cl.
USPC ........... 709/223; 709/224; 709/225; 709/227; 709/228

(58) Field of Classification Search
USPC .................. 709/223, 227; 370/331, 336, 401
See application file for complete search history.

(56) References Cited

U.S. PATENT DOCUMENTS

| 6,707,813 | B1* | 3/2004 | Hasan et al. | 370/356 |
| 2007/0281699 | A1* | 12/2007 | Rasanen | 455/436 |
| 2008/0046963 | A1* | 2/2008 | Grayson et al. | 726/1 |
| 2008/0254768 | A1* | 10/2008 | Faccin | 455/411 |
| 2009/0215454 | A1* | 8/2009 | Przybysz et al. | 455/435.1 |
| 2009/0305684 | A1* | 12/2009 | Jones et al. | 455/418 |
| 2010/0142517 | A1* | 6/2010 | Montemurro et al. | 370/352 |
| 2010/0150003 | A1* | 6/2010 | Andreasen et al. | 370/252 |
| 2010/0281151 | A1* | 11/2010 | Ramankutty et al. | 709/223 |
| 2010/0290392 | A1* | 11/2010 | Rasanen et al. | 370/328 |
| 2011/0188457 | A1* | 8/2011 | Shu et al. | 370/329 |

OTHER PUBLICATIONS

Policy & Charging Rules Function Test Application—Spirent, Jun. 2010 http://www.spirent.com/~/media/Datasheets/Broadband/PAB/Landslide/Landslide_PCRF_datasheet.pdf.*
"IP multimedia call control protocol based on Session Initiation Protocol (SIP) and Session Description Protocol (SDP)"—Mar. 2007 3GPP.*

* cited by examiner

*Primary Examiner* — Krista Zele
*Assistant Examiner* — Randy Scott

(57) ABSTRACT

A system includes a first device, in a first network; a second device, in a second network; and a policy rules and charging function (PCRF) database that associates Internet Protocol (IP) addresses assigned to user equipment (UE) devices with PCRF devices; where the first device is to identify a plurality of policy rules and charging function (PCRF) devices in the first network, select a PCRF device from the plurality of PCRF devices based on a selection rule, and provide information about the selected PCRF device to the second device; and where the second device is to receive a request to set up a communication session associated with a UE device; determine an IP address associated with the UE device; identify a PCRF device, based on the determined IP address, by accessing the PCRF database, and send session information associated with the communication session to the identified PCRF device.

20 Claims, 10 Drawing Sheets

US 8,521,858 B2

SELECTION OF A POLICY AND CHARGING RULES FUNCTION DEVICE

BACKGROUND INFORMATION

Wireless communication networks continue to increase in popularity, leading to increasing numbers of users and to demands for additional services. The increasing numbers of users and implementation of new services lead to increased network complexity. Furthermore, wireless communication networks may need to interact with core packet networks to provide services, such as multimedia services and/or voice over Internet Protocol (VoIP) services. In order to manage services for subscribers, a wireless communication network may need to implement mechanisms for establishing a policy and charging function (PCRF). A PCRF may, for example, establish Quality of Service (QoS) requirements, bandwidth, and/or charges for a particular service for a particular subscriber. Given the increasing complexity of wireless communication networks, and the need of wireless communication networks to interact with other networks, efficiently implementing a PCRF can be quite challenging.

DETAILED DESCRIPTION OF PREFERRED EMBODIMENTS

The following detailed description refers to the accompanying drawings. The same reference numbers in different drawings identify the same or similar elements. Also, the following detailed description does not limit the invention.

An implementation described herein may relate to selecting a PCRF device from a plurality of PCRF devices in a network and ensuring that two different devices select the same PCRF device. For example, an implementation described herein relates to selecting, by a first device, one of a plurality of PCRF devices; establishing, by the first device, a Gx interface with the selected PCRF device; selecting, by a second device, the same PCRF device; and establishing, by the second device, an Rx interface with the selected PCRF device.

Figure 1:
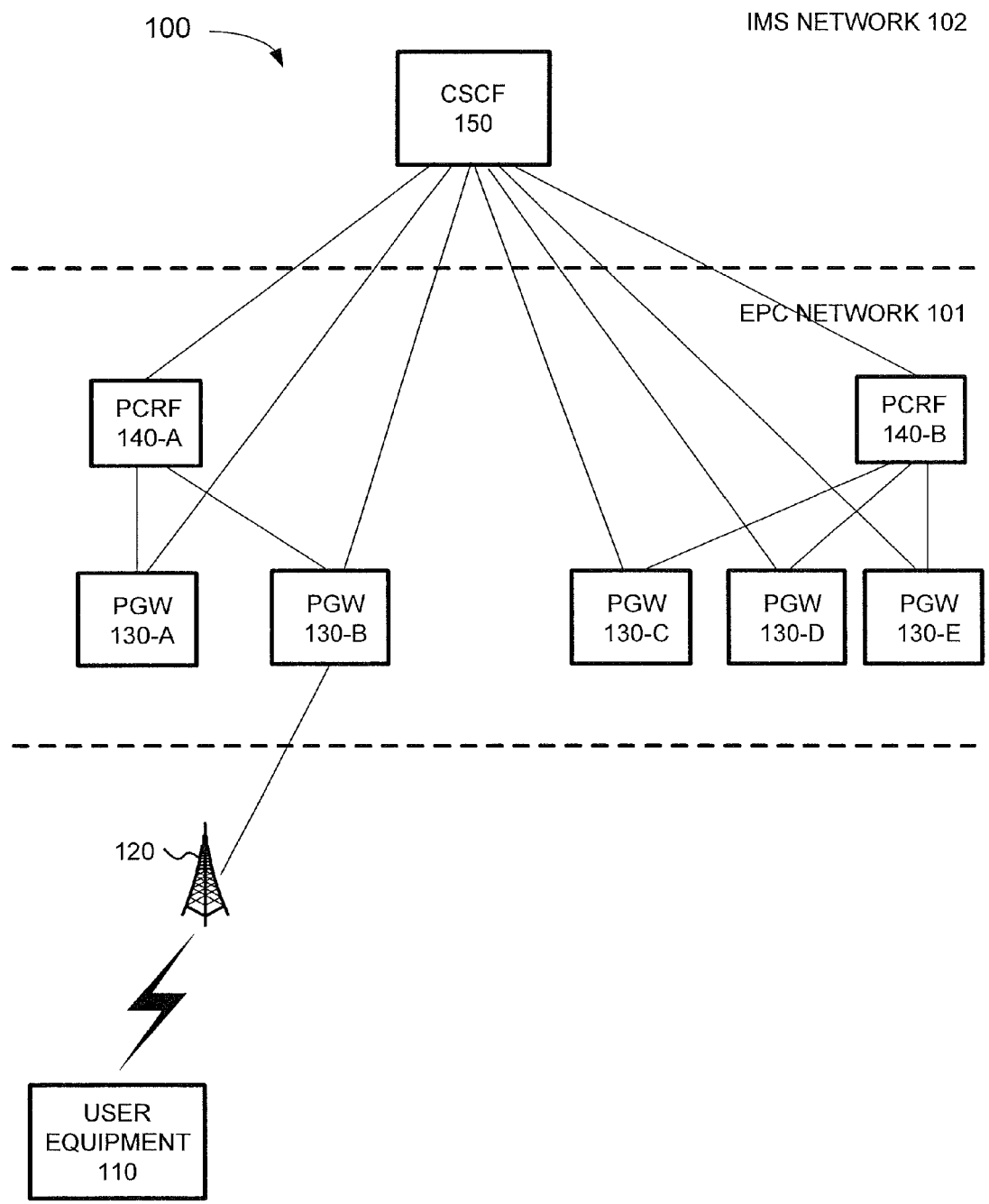
FIG. 1 is a diagram illustrating an overview of a system that includes multiple PCRF devices according to an implementation described herein.

FIG. 1 is a diagram illustrating an overview of a system 100 that includes multiple PCRF devices according to an implementation described herein. System 100 may include a user equipment (UE) device 110, base station 120, an Evolved Packet Core (EPC) network 101 and an Internet Protocol Multimedia Subsystem (IMS) network 102. UE device 110 may connect to EPC network 101 via base station 120, and EPC network 101 may connect to IMS network 102. Thus, a user using UE device 110 may access services available in IMS network 102 through EPC network 101.

Figure 3:
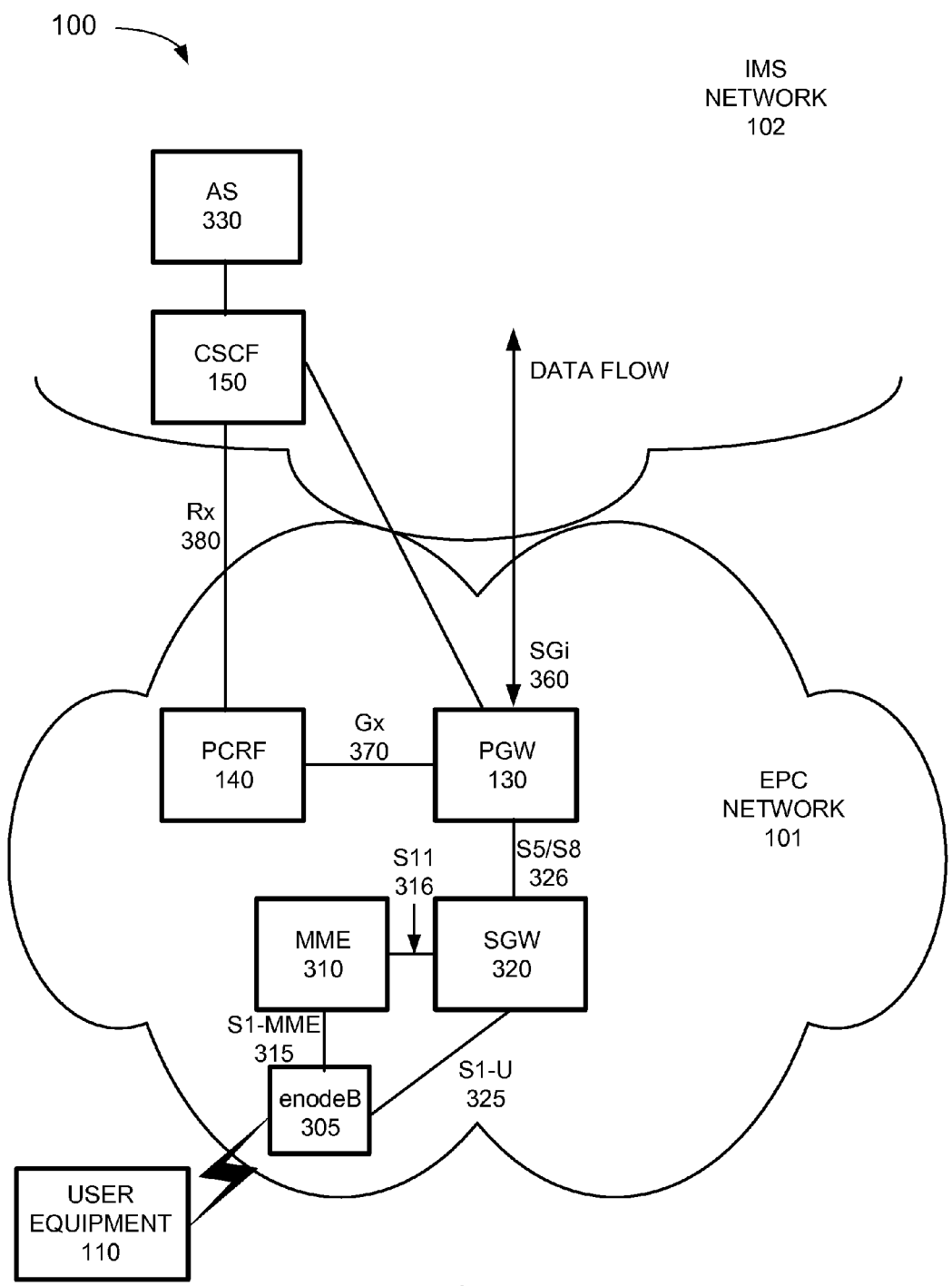
FIG. 3 is a diagram illustrating a more detailed view of the system of FIG. 2.
Figure 11:
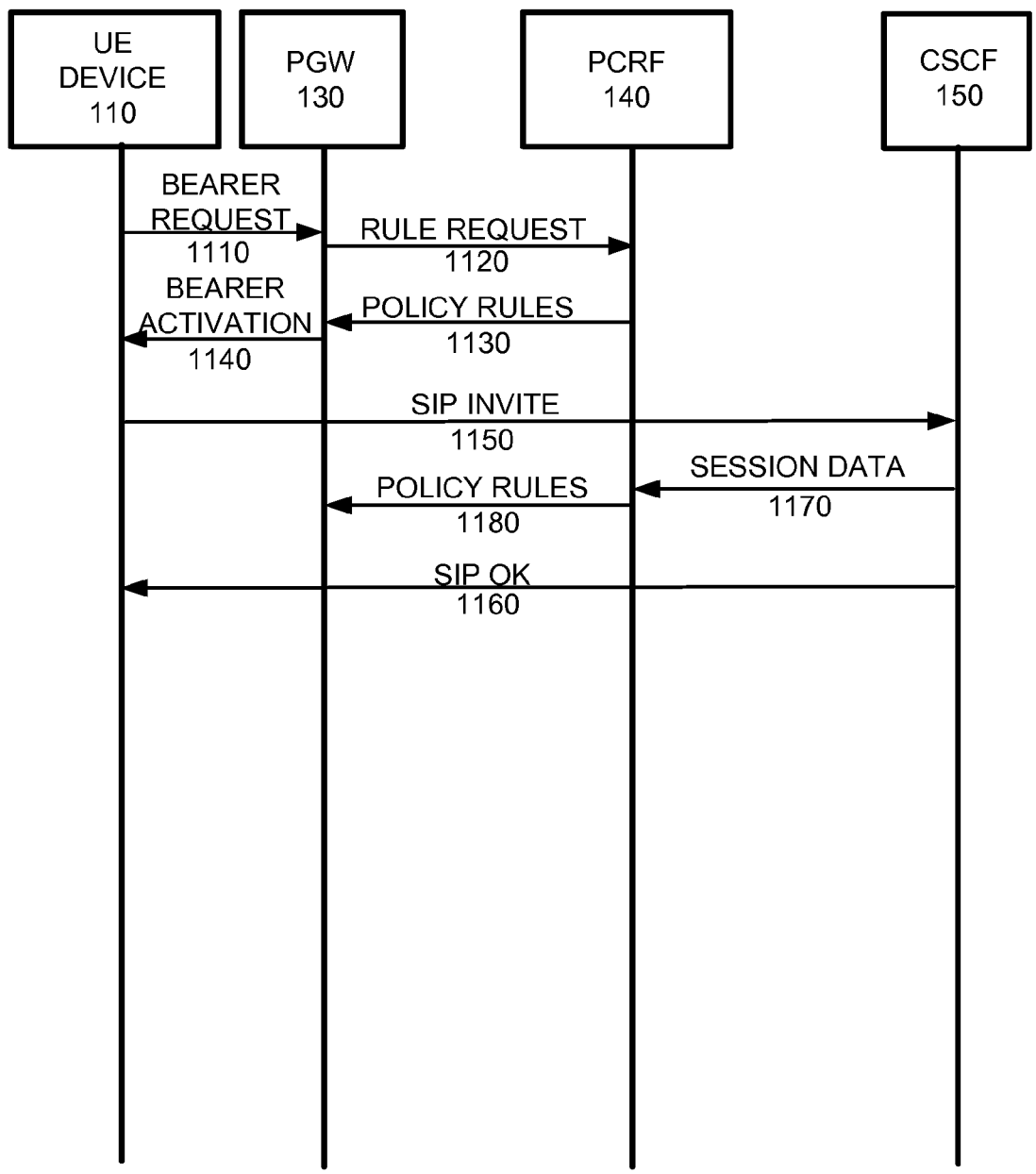
FIG. 11 is an example of a signal flow according to an implementation described herein.

EPC network 101 may include packet data network (PDN) gateways 130-A to 130-B (referred to collectively as "PDN gateways 130," and individually as "PDN gateway 130") and PCRF devices 140-A and 140-B (referred to collectively as "PCRF devices 140," individually as "PCRF device 140," and shown as "PGW" in FIGS. 1, 3, and 11). A user may connect to IMS network 102 through a particular PDN gateway 130. Each PDN gateway 130 may be connected to a PCRF device 140 and may receive policy and/or charging rules from PCRF device 140. A large EPC network 101 may include multiple PCRF devices 140, and a particular PDN gateway 130 may need to select, and communicate with, a particular PCRF device 140.

IMS network 102 may include a call session control function (CSCF) device 150. When a user connects to IMS network 102, a call session control function device 150 may process signaling packets from UE device 110 during a session. CSCF device 150 may provide session information to a PCRF device 140 associated with UE device 110, so that PCRF device 140 may provide policies, based on the session, to PDN gateway 130 serving UE device 110 so that PDN gateway 130 may enforce the applicable policies. However, when EPC network 101 includes multiple PCRF devices 140, CSCF device 150 may need to identify the particular PCRF device 140 that is associated with PDN gateway 130 through which UE device 110 connects to IMS network 102. For example, if UE device 110 connects to IMS network 102 via PDN gateway 130-B, CSCF device 150 may need to know whether to communicate with PCRF device 140-A, or with PCRF device 140-B. Without coordinating a selection of a PCRF device 140 between PDN gateway 130 and CSCF device 150, CSCF device 150 may select a different PCRF device 140 (e.g., PCRF device 140-B) than the PCRF device 140 (e.g., PCRF device 140-A) selected by PDN gateway 130 (e.g., PDN gateway 130-B). In such a case, PCRF device 140 receiving the session information from CSCF device 150 may not be able to communicate the policies to the correct PDN gateway 130; as a result, PDN gateway 130 may not be able to enforce the applicable policies to the session set up by the CSCF for UE device 110.

An implementation described herein relates to assigning a pool of IP addresses to each PDN gateway 140 in EPC network 101. When a particular UE device 110 attaches to a PDN gateway 130 (e.g., a particular PDN gateway 130 that is physically the closest to UE device 110), PDN gateway 130 may assign an IP address to UE device 110 from the IP address pool. Additionally, a selection rule for selecting a particular PCRF device 140 by a PDN gateway 130 may be set. For example, PDN gateway 130 may select a particular PCRF device 140 that is physically the closest to PDN gateway 130. When a particular CSCF device 150, serving a particular UE device 110, needs to select a PCRF device 140, CSCF device 150 may use the IP address assigned to UE device 110 to determine PDN gateway 140 serving UE device 110. Based on the determined PDN gateway 140, CSCF device 150 may identify a particular PCRF device 140 that is in communication with the PDN gateway 140 that is serving UE device 110. For example, CSCF device 150 may access a table that associates IP addresses with PCRF devices 140.

Figure 2:
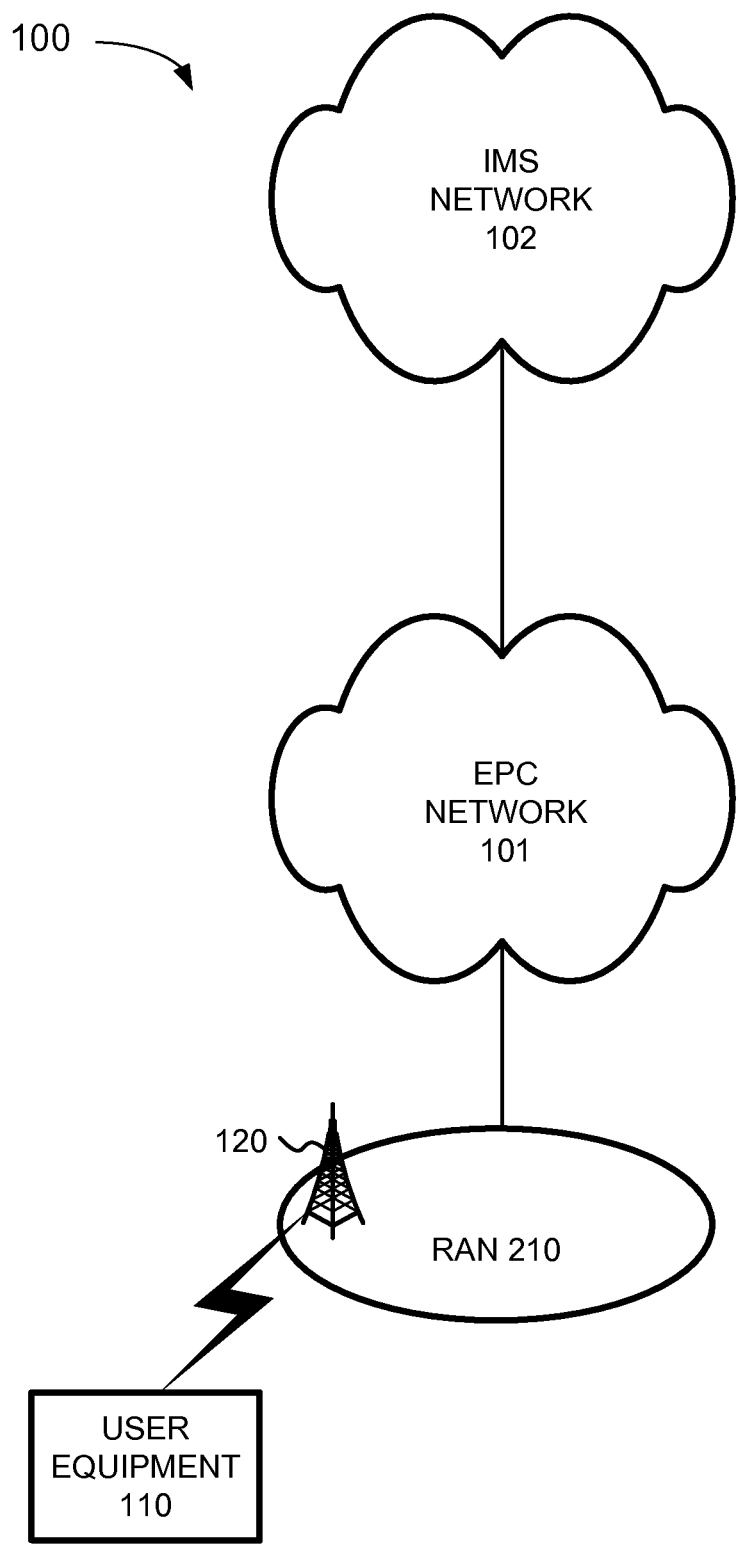
FIG. 2 is a diagram illustrating exemplary components of a system according to an implementation described herein.

FIG. 2 is a diagram illustrating exemplary components of system 100 according to an implementation described herein. System 100 may include UE device 110, a radio access network (RAN) 210, EPC network 101, and IMS network 102.

UE device 110 may include any communication device that a user may use to connect to RAN 210. For example, UE device 110 may include a mobile communication device, such as a mobile phone, a personal digital assistant (PDA), or a media playing device with communication capabilities; a desktop device, such as a personal computer or a workstation; a laptop computer; a telephone terminal; or any other communication device or combinations thereof.

RAN 210 may include one or more base stations 120 and other components that allow UE devices 110 to connect to EPC network 220. In one implementation, RAN 210 may be based on the Long Term Evolution (LTE) standard specified by Third Generation Partnership Project (3GPP), and base station 120 may correspond to an eNodeB (the LTE base station). In other implementations, RAN 210 may include a network based on a different standard. For example, RAN 210 may include a Global System for Mobile Communications (GSM) radio network with General Packet Radio Service (GPRS); a Wideband Code Division Multiple Access (WCDMA) radio network with High Speed Packet Access (HSPA); or a non-3GPP radio network, such as a CDMA radio network.

EPC network 101 may include an evolved packet core network as specified by 3GPP. EPC network 101 may include one or more devices that implement logical entities interconnected via standardized interfaces, and that provide packet-switched services over RAN 210 and provide Internet Protocol (IP) connectivity to UE 110 for both data and voice services. EPC network 101 may allow the delivery of broadband IP services and may interface with IMS network 102 and other external IP networks (not shown in FIG. 2). EPC network 101 may also provide functions for management and enforcement of EPC bearers. An EPC bearer may be thought of as a transport channel with a specific set of QoS requirements.

IMS network 102 may include a network for delivering IP multimedia services as specified by 3GPP. IMS network 102 may include one or more devices that implement logical entities interconnected via standardized interfaces, and that use Session Initiation Protocol (SIP) for establishing and managing media sessions over IP networks, thus enabling IP multimedia services to be delivered to UE device 110. IMS network 102 may also provide media flows between UE device 110 and external IP networks or external circuit-switched networks (not shown in FIG. 2). For example, IMS network 102 may interface one or more of a local area network (LAN), a wide area network (WAN), a metropolitan area network (MAN), a wireless network, such as a general packet radio service (GPRS) network, an ad hoc network, a public switched telephone network (PSTN), a subset of the Internet, any other network, or any combination thereof.

FIG. 3 is a diagram illustrating a more detailed view of system 100 of FIG. 2. As shown in FIG. 3, EPC network 101 may include an eNodeB device 305, a Mobility Management Entity (MME) device 310, a Serving Gateway (SGW) 320, PDN Gateway 130, and PCRF device 140. IMS network 102 may include CSCF device 150 and Application Server (AS) 330.

eNodeB device 305 may correspond to base station 120. eNodeB device 305 may include functionality necessary to establish a wireless connection between UE 110 and EPC network 101. eNodeB 305 may interface to EPC network 102 via the S1 interface, which may be split into control plane S1-MME interface 315 and data place S1-U interface 325. S1-MME interface 315 may interface to MME device 310. MME device 310 may implement control plane processing for EPC network 101. For example, MME device 310 may select a particular SGW 320 for a particular UE 110, may implements tracking and paging procedures for UE 110, may activate and deactivate bearers for UE 110, and may interface to non-LTE radio access networks.

S1-U interface 325 may interface to SGW 320. SGW 320 may provide an access point to and from UE 110 and may handle forwarding of data packets for UE 110 and act as a local anchor point during hand-over procedures between eNodeB devices. MME device 310 may interface with SGW 320 through S11 interface 316. SGW 320 may interface with PDN gateway 130 through S5/S8 interface 326. PDN gateway 130 may function as a gateway to an IP network (e.g., IMS network 102). A particular UE 110, while connected to a single SGW 320, may be connected to multiple PDN gateways 130, one for each IP network with which UE device 110 communicates. PDN gateway 130 may assign an IP address to UE 110. PDN gateway 130 may connect to an external IP network (e.g., IMS network 201) via SGi interface 360, which may cause the external IP network to perceive PDN gateway 130 as an IP router.

PDN gateway 130 may connect to PCRF device 140 via Gx interface 370. PCRF device 140 may implement PCRF, such as establishing QoS requirements, bandwidth, and/or charges for a particular service for a particular subscriber. PCRF device 140 may receive information from an Application Function via Rx interface 380 with respect to a particular data flow associated with UE 110, may determine the appropriate PCRF parameters for the particular data flow, and may forward the PCRF parameters to PDN gateway 130 for enforcement via Gx interface 370. In the case of IMS, the Application Function communicating with PCRF device 140 via the Rx interface 380 may include CSCF device 150.

CSCF device 150 may handle signaling, controlling of media paths, and activation of applications. CSCF device 150 may interact with a home subscriber server (not shown in FIG. 3) to access subscriber information and perform authentication and authorization for a user. CSCF 150 may determine service session information for a particular session and provide the service session information to PCRF device 140. Application server 330 may implement particular services and interact with CSCF device 150 to deliver the particular services to UE device 110. Examples of services provided by Application server 330 may include multimedia telephone services or IP television services.

Although FIGS. 1-3 show exemplary components of system 100, in other implementations, system 100 may include fewer components, different components, or additional components than depicted in FIGS. 1-3. Additionally or alternatively, one or more components of system 100 may perform the tasks described as being performed by one or more other components of system 100. For example, while FIGS. 1 and 3 depict a single CSCF device 150, an IMS network 102 may include multiple CSCF devices 150.

Figure 4:
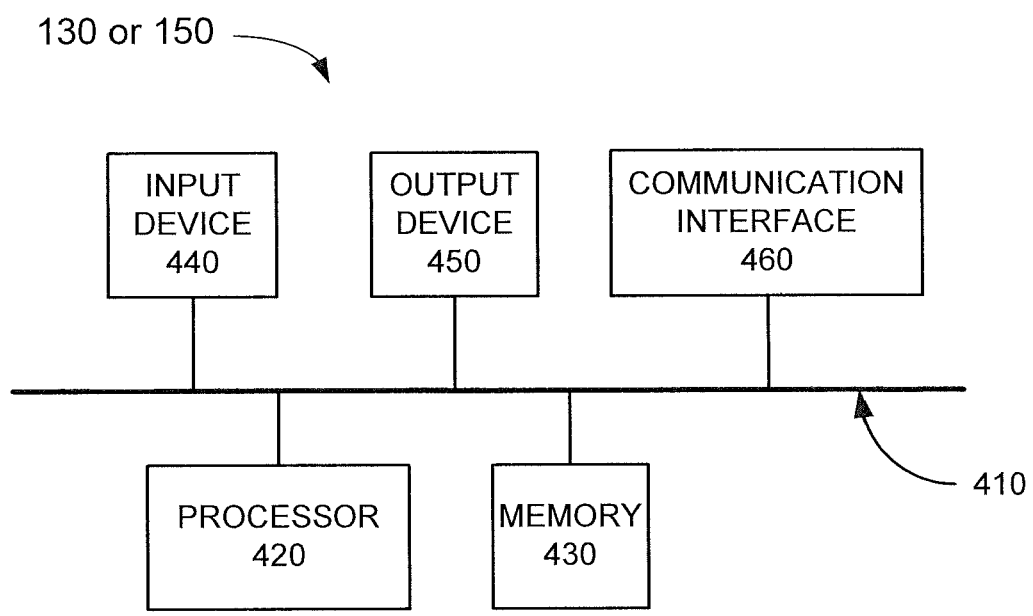
FIG. 4 is a diagram illustrating exemplary components of a device implementing a packet data network gateway or a device implementing a call session control function according to an implementation described herein.

FIG. 4 is a diagram illustrating exemplary components of a computing device implementing a PDN gateway 130, or a computer device implementing CSCF device 150 according to an implementation described herein. The computer device may include a bus 410, a processor 420, a memory 430, an input device 440, an output device 450, and a communication interface 460.

Bus 410 may include a path that permits communication among the components of the computer device. Processor 420 may include a processor, a microprocessor, or processing logic (e.g., an application specific integrated circuit (ASIC) or a field programmable gate array (FPGA)) that may interpret and execute instructions. Memory 430 may include a random access memory (RAM) device or another type of dynamic storage device that may store information and instructions for execution by processor 420, a read only memory (ROM) device or another type of static storage device that may store static information and instructions for use by processor 420, a magnetic and/or optical recording memory device and its corresponding drive, and/or a removable form of memory, such as a flash memory.

Input device 440 may include a mechanism that permits an operator to input information to the computer device, such as a keyboard, a mouse, a button, a pen, a touch screen, voice recognition and/or biometric mechanisms, etc. Output device 450 may include a mechanism that outputs information to the operator, including a display, a light emitting diode (LED), a speaker, etc. Communication interface 460 may include any transceiver-like mechanism that enables the computer device to communicate with other devices and/or systems. For example, communication interface 460 may include mechanisms for communicating with another device or system via a network, such as EPC network 101 or IMS network 102. For example, communication interface 460 may include a modem, a network interface card, or a wireless interface card.

As will be described in detail below, the computer device may perform certain operations relating to the processing of comments. The computer device may perform these operations in response to processor 420 executing software instructions contained in a computer-readable medium, such as memory 430. A computer-readable medium may be defined as one or more logical or physical memory devices. A logical memory device may include space within a single physical memory device or spread across multiple physical memory devices.

The software instructions may be read into memory 430 from another computer-readable medium, or from another device via communication interface 460. The software instructions contained in memory 430 may cause processor 420 to perform processes that will be described later. Alternatively, hardwired circuitry may be used in place of or in combination with software instructions to implement processes described herein. Thus, implementations described herein are not limited to any specific combination of hardware circuitry and software.

Although FIG. 4 shows exemplary components of a computer device implementing a PDN gateway 130, or a computer device implementing a call session control function 150, in other implementations, a computer device implementing a PDN gateway 130, or a computer device implementing a call session control function 150, may contain fewer components, different components, additional components, or differently arranged components than depicted in FIG. 4. Additionally or alternatively, one or more components of a computer device implementing a PDN gateway 130, or a computer device implementing a call session control function 150, may perform one or more tasks described as being performed by one or more other components of a computer device implementing PDN gateway 130, or of a computer device implementing a call session control function 150.

Figure 5:
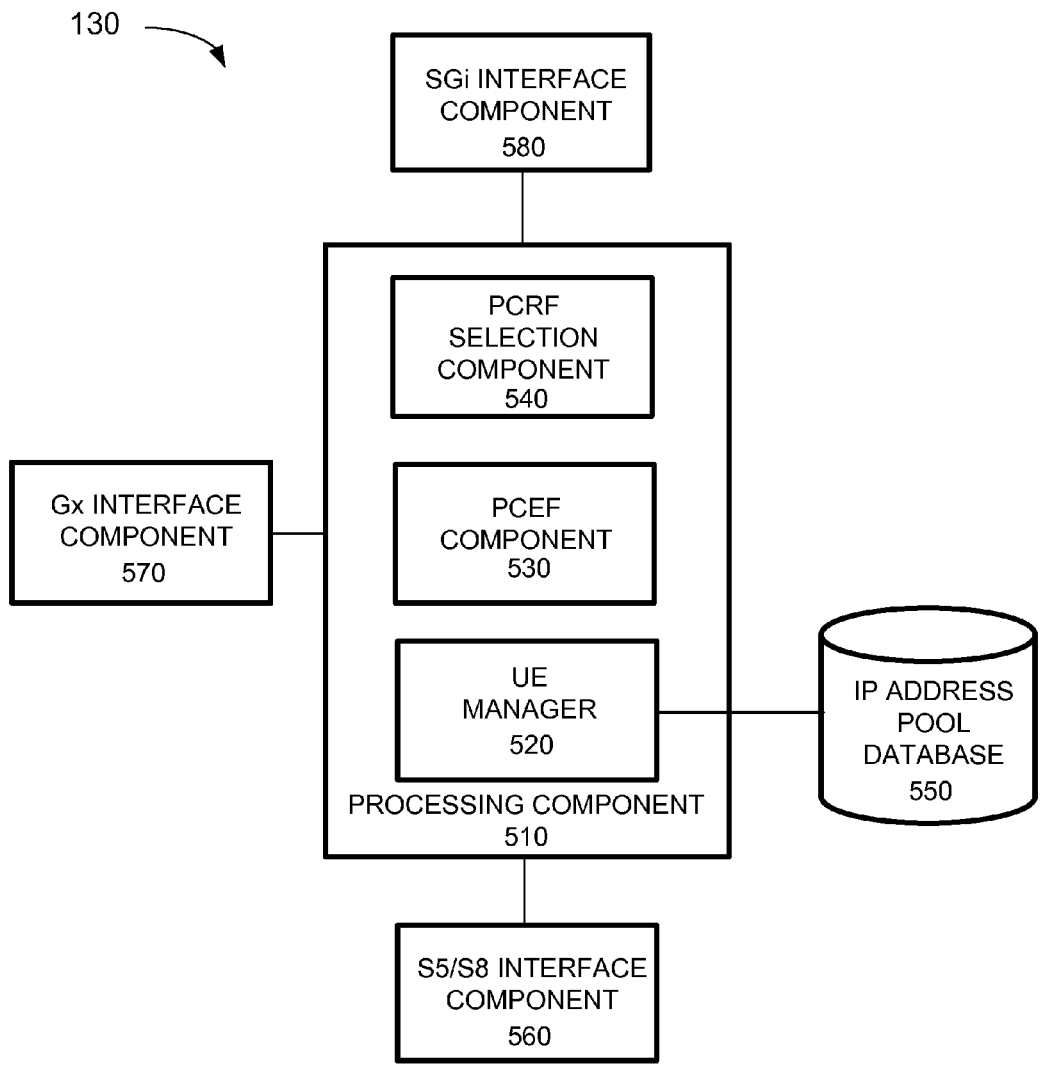
FIG. 5 is a diagram illustrating exemplary functional components of a packet data network gateway according to an implementation described herein.

FIG. 5 is a diagram illustrating exemplary functional components of PDN gateway 130 according to an implementation described herein. PDN gateway 130 may include a processing component 510, an IP address pool database 550, an S5/S8 interface component 560, a Gx interface component 570, and an SGi interface component 580. Processing component 510 may perform processing functions and may include a UE manager 520, a policy and charging enforcement (PCEF) component 530, and a PCRF selection component 540.

UE manager 520 may manage IP addresses assigned to UE devices 110. When a new UE device 110 attaches to EPC network 101, UE manager 520 may select an IP address from an available pool of IP addresses and assign the IP address to the new UE device 110. UE manager 520 may store the assignment in IP address pool database 550. IP address pool database 550 may store information that associates IP addresses with particular UE devices 110.

PCEF component 530 may receive policy rules from PCRF device 140 via Gx interface component 570 and may enforce policy decisions received from PCRF device 140. For example, PCEF component 530 may perform packet scheduling, discarding of particular packets, gating control of data flows, and/or policing bit rates. PCEF component 530 may also provide data flow statistics, such as traffic volume or session duration information, to PCRF device 140.

PCRF selection component 540 may obtain a list of PCRF devices 140 in EPC network 101 and may select a particular PCRF device 140 from the list based on one or more selection rules. For example, a particular PCRF device 140 that is geographically closest to the PDN gateway 130 may be selected. Other examples of selection rules used to select a particular PCRF device 140 may include selecting a PCRF device based a number of network nodes between PDN gateway 130 and a particular PCRF device 140, an amount of time it takes a packet to reach the particular PCRF device 140, or based on load balancing computing resources among the available PCRF devices 140 in EPC network 101.

PCRF selection component 540 may provide information about the selected PCRF device 140 to other devices in EPC network 101 or IMS network 102. For example, PCRF selection component 540 may send, via SGi interface component 580, information to CSCF device 150, indicating that the selected PCRF device 140 should be associated with the particular PDN gateway 130 that sent the information.

S5/S8 interface component 560 may interface PDN gateway 130 with SGW 320. S5/S8 interface component 560 may implement an S5 interface when SGW 320 is located in a home network and UE device 110 is not roaming. S5/S8 interface component 560 may implement an S8 interface when SGW 320 is located in a visited network and UE device 110 is in a roaming situation. In one implementation, S5/S8 interface component 560 may communicate with SGW 320 using General Packet Radio Service Tunneling Protocol version 2 (GTPv2). S5/S8 interface component 560 may receive GTPv2 packets from SGW 320 and retrieve IP packets from the received GTPv2 packets. S5/S8 interface component 560 may receive IP packets from an external IP network (e.g., IMS network 102), encapsulate the received IP packets into GTPv2 packets, and send the GTPv2 packets to SGW 320. In another implementation, S5/S8 interface component 560 may use a different protocol.

Gx interface component 570 may interface PDN gateway 130 with PCRF device 140. In one implementation, Gx interface component 570 may communicate with PCRF device 140 using Diameter protocol. Gx interface component 570 may receive Diameter protocol packets from PCRF device 140, retrieve policy rules from the Diameter protocol packets, and provide the retrieved policy rules to PCEF component 530. Gx interface component 570 may receive data flow statistics from PCEF component 530, generate Diameter protocol packets with the data flow statistics, and send the Diameter protocol packets to PCRF device 140. In another implementation, Gx interface component 570 may use a different protocol.

SGi interface component 580 may interface PDN gateway 130 with an external IP network (e.g., with IMS network 102). In one implementation, SGi interface component 580 may communicate with IMS network 102 using IP. Thus, IMS network 102 may interact with PDN gateway 130 as if PDN gateway 130 were an IP router in IMS network 102.

Although FIG. 5 shows exemplary functional components of PDN gateway 130, in other implementations, PDN gateway 130 may contain fewer functional components, different functional components, differently arranged functional components, or additional functional components than depicted in FIG. 5. Additionally or alternatively, one or more functional components of PDN gateway 130 may perform one or more other tasks described as being performed by one or more other functional components of PDN gateway 130.

Figure 6:
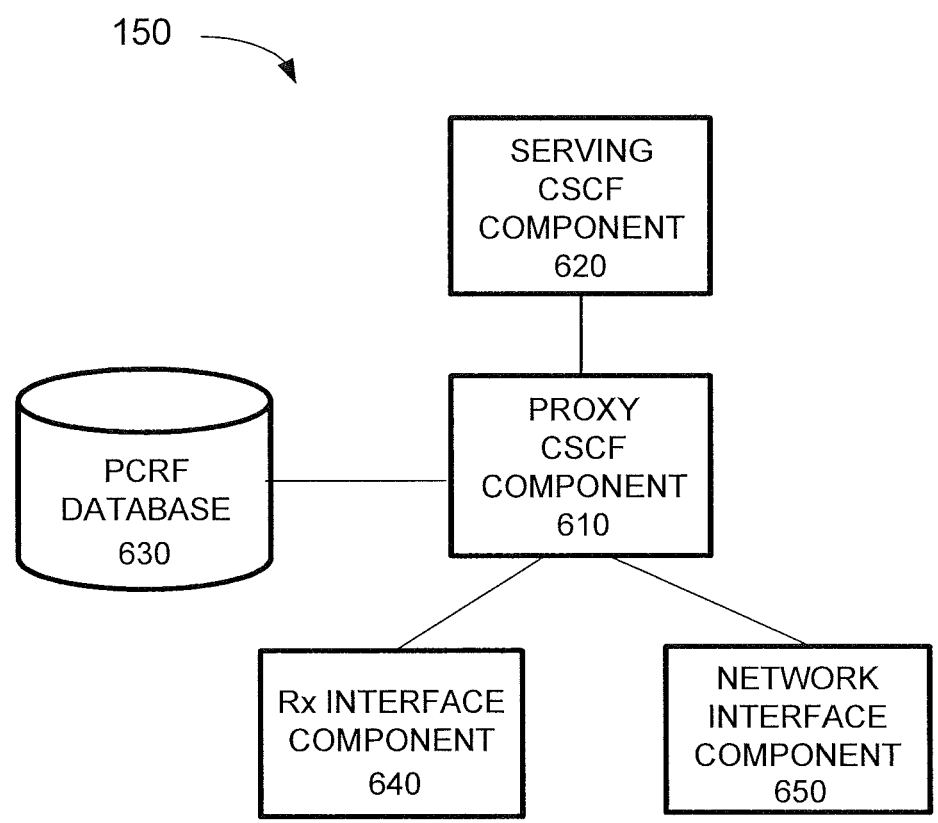
FIG. 6 is a diagram illustrating exemplary functional components of a call session control function according to an implementation described herein.

FIG. 6 is a diagram illustrating exemplary functional components of call session control function device 150 according to an implementation described herein. CSCF device 150 may include a Proxy CSCF (P-CSCF) component 610, a Serving CSCF (S-CSCF) component 620, a PCRF database 630, an Rx interface component 640, and a network interface component 650.

P-CSCF component 610 may function as a SIP proxy that provides a signaling path between UE device 110 and S-CSCF component 620. P-CSCF component 610 may inspect messages sent form UE device 110 to IMS network 102, may authenticate UE device 110, and/or may perform policy control and/or generate charging data associated with session in IMS network 102.

S-CSCF component 620 may manage sessions in IMS network 102 and may interact with a home subscriber server (HSS) (not shown in FIG. 6) to manage user profiles associated with users of UE devices 110. S-CSCF component 620 may receive messages from P-CSCF component 630 and decide to which application server to forward particular messages PCRF database 630 may store information that associates IP addresses assigned to UE devices 110 with PCRF devices 140, and/or with PDN gateways 130.

Rx interface component 630 may interface CSCF device 150 with PCRF device 140. In one implementation, Rx interface component 630 may communicate with PCRF device 140 using Diameter protocol. Rx interface component 630 may receive session information from P-CSCF component 610, generate Diameter protocol packets that include the session information, and send the Diameter protocol packets to PCRF device 140. Rx interface component 630 may receive acknowledgement messages from PCRF device 140. In another implementation, Rx interface component 630 may use a different protocol.

Network interface component 650 may interface CSCF device 150 to IMS network 102. For example, network interface component 650 may receive and send IP packets to other nodes in IMS network 102.

Although FIG. 6 shows exemplary functional components of call session control function device 150, in other implementations, of call session control function device 150 may contain fewer functional components, different functional components, differently arranged functional components, or additional functional components than depicted in FIG. 6. Additionally or alternatively, one or more functional components of call session control function device 150 may perform one or more other tasks described as being performed by one or more other functional components of call session control function device 150. For example, while FIG. 6 shows PCRF database 630 as part of CSCF device 150, PCRF database 630 need not be local to CSCF device 630, but may be located remotely from CSCF device 150. In an implementation where PCRF database 630 is remote from CSCF device 150, PDN gateway 130 may send information about a selected PCRF device to PCRF database 630.

Figure 7A:
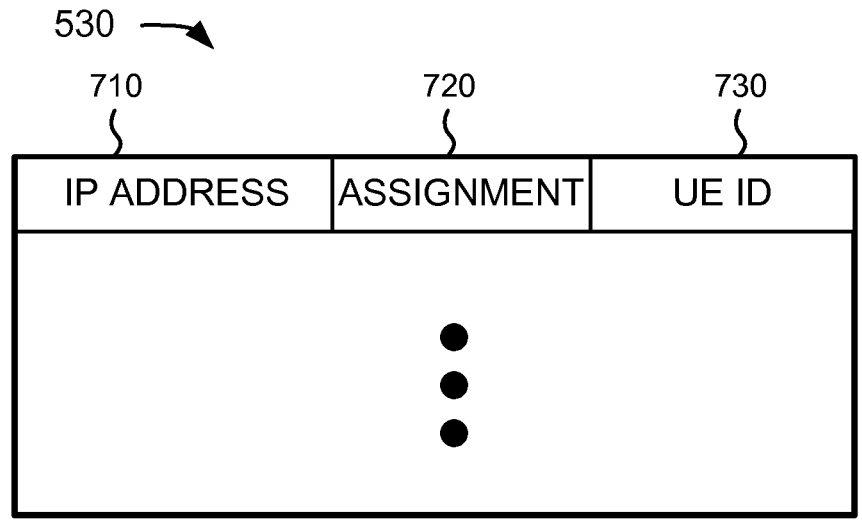
FIG. 7A is a diagram of exemplary fields that may be provided within an IP address pool database according to an implementation described herein.

FIG. 7A is a diagram of exemplary fields that may be provided within IP address pool database 550 according to an implementation described herein. In one implementation, IP address database 550 may be implemented in a storage device included as part of memory 430 of PDN gateway device 130. In another implementation, IP address database 550 may be stored in a memory associated with another device or a group of devices, separate from or including PDN gateway device 130, of EPC network 220. IP address pool database 550 may include an IP address field 710, an assignment field 720, and a UE identification (ID) field 730.

IP address field 710 may store a particular IP address form a pool of IP addresses assigned to PDN gateway device 130. Assignment field 720 may store information about whether the IP address stored in IP address field 710 has been assigned to a UE device or whether the IP address is available to be assigned. UE ID field 730 may identify a particular UE device 110 that has been assigned to the IP address stored in IP address field 710. For example, UE ID field 730 may store the International Mobile Subscriber Identity (IMSI) number stored in the Subscriber Identity Module (SIM) of UE device 110 that has been assigned the IP address stored in IP address field 710.

Although FIG. 7A shows exemplary fields of IP address pool database 550, in other implementations, IP address pool database 550 may contain fewer fields, different fields, additional fields, or differently arranged fields than depicted in FIG. 7A. Additionally or alternatively, one or more fields of IP address pool database 550 may include information described as being included in one or more other fields of IP address pool database 550.

Figure 7B:
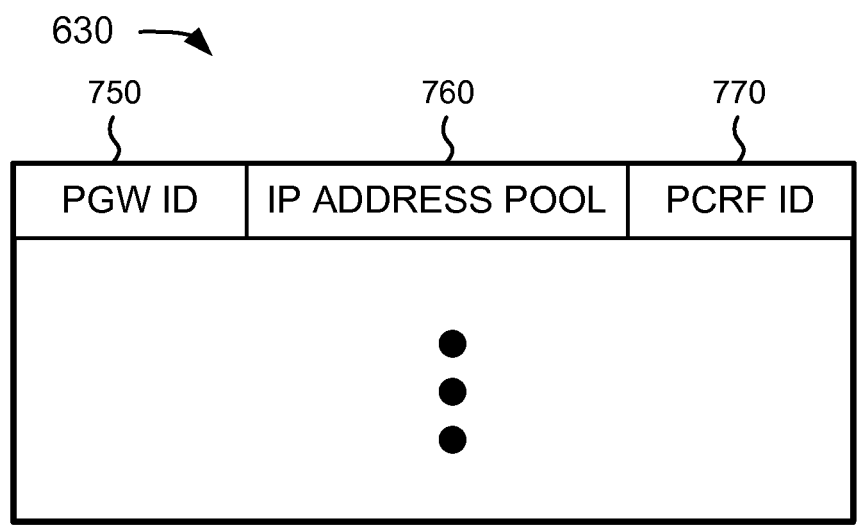
FIG. 7B is a diagram of exemplary fields that may be provided within a PCRF database according to an implementation described herein.

FIG. 7B is a diagram of exemplary fields that may be provided within PCRF database 630 according to an implementation described herein. In one implementation, PCRF database 630 may be implemented in a storage device included as part of memory 430 of CSCF device 150. In another implementation, PCRF database 630 may be stored in a memory associated with another device or a group of devices, separate from or including PCRF database 630, of IMS network 230. PCRF database 630 may include a PDN gateway ID field 750, an IP address pool field 760, and a PCRF ID field 770.

PDN gateway ID field 750 may store information identifying a particular PDN gateway 130. In one implementation, PDN gateway ID field 750 may store the IP address of the particular PDN gateway 130. In another implementation, PDN gateway ID field 750 may store a different identifier for the particular PDN gateway 130.

IP address pool field 760 may store a list of IP addresses that have been assigned to the particular PDN gateway 130.

PCRF ID field 770 may store information identifying a particular PCRF device 140. In one implementation, PCRF ID field 760 may store the IP address of the particular PCRF device 140. In another implementation, PCRF ID field 760 may store a different identifier for the particular PCRF device 140.

Although FIG. 7B shows exemplary fields of PCRF database 630, in other implementations, PCRF database 630 may contain fewer fields, different fields, additional fields, or differently arranged fields than depicted in FIG. 7B. Additionally or alternatively, one or more fields of PCRF database 630 may include information described as being included in one or more other fields of PCRF database 630.

Figure 8:
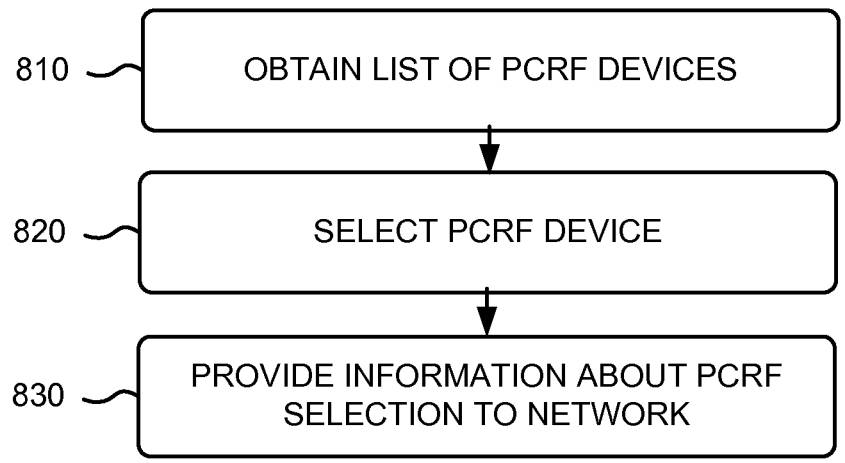
FIG. 8 is a flow diagram illustrating a process for selecting a PCRF by a packet data network gateway according to an exemplary implementation.

FIG. 8 is a flow diagram illustrating a process for selecting a PCRF by a PDN gateway according to an exemplary implementation. In one implementation, the process of FIG. 8 may be performed by PDN gateway 130. In other implementations, some or all of the process of FIG. 8 may be performed by another device or a group of devices separate from or including PDN gateway 130.

The process of FIG. 8 may include obtaining a list of PCRF devices in a network (block 810). In one implementation, a list of active PCRF devices 140 in EPC network 101, from which a particular PCRF device 140 is to be selected, may be created manually. For example, an administrator may create a list of PCRF devices 140 in EPC network 101 and may store the list of PCRF devices 140, along with a geographic location and/or network topology information for each PCRF device 140, in a database accessible to PDN gateways 130.

In another implementation, PCRF devices 140 may be identified by PDN gateway 130 through network discovery. For example, PDN gateway 130 may perform peer discovery using Diameter protocol to identify PCRF devices 140 in EPC network 101. Once PCRF devices 140 are identified, PDN gateway 130 may obtain information necessary to select one of the identified PCRF devices 140.

A PCRF device may be selected (block 820). For example, PDN gateway 130 may select a particular PCRF device 140 based on one or more selection rules. In one implementation, PDN gateway 130 may select the nearest PCRF device 140. In one implementation, the nearest PCRF device 140 may be determined based on geographic location. Geographic location of a particular PCRF device 140 may be determined based on the IP address of the particular PCRF device 140. In another implementation, the nearest PCRF device 140 may be determined based on network topology. For example, the nearest PCRF device 140 may be determined to be a particular PCRF device 140 with the fewest number of network nodes between the particular PCRF device 140 and PDN gateway 130. In yet another implementation, the nearest PCRF device 140 may be determined based on another technique.

In another implementation, PDN gateway 130 may select a particular PCRF device 140 based on a selection rule other than identifying the nearest PCRF device 140. For example, PDN gateway 130 may send a test packet to each available PCRF device 140 and may determine how long it takes for the test packet to return. PDN gateway 130 may select the particular PCRF device 140 which returned the test packet in the shortest amount of time. As yet another example, PCRF devices 140 may be load-balanced with respect to PDN gateways 130 and a particular PCRF device 140 may be selected based on being assigned to the least number of PDN gateways 130, or based on an analysis of historical usage of computation resources (over a particular time period) compared to other PCRF devices 140 in EPC network 101. In such an implementation, if PCRF devices 140 are selected based on historical usage of computation resources, a different PCRF device 140 may be selected at a later time if usage of computation resources used by particular PCRF devices 140 changes. In yet another implementation, PDN gateway 130 may use any combination of selection rules described above.

Information about the PCRF selection may be provided to the network (block 830). PDN gateway 130 may store information identifying the selected PCRF device locally. For example, PDN gateway 130 may store the IP address of the selected PCRF device in a storage location associated with Gx interface component 570. Another device of EPC network 101 or IMS network 102 may query PDN gateway 130 for the selected PCRF device 140, and PDN gateway 130 may provide information identifying the selected PCRF device 140 in response to the query. Alternatively or additionally, PDN gateway 130 may forward information identifying the selected PCRF device to IMS network 102, in response to selecting PCRF device 140. CSCF device 150 may receive the forwarded information and may update PCRF database 630 with the received information.

If, at a later time, the selected PCRF device goes out of service, or if connectivity between the selected PCRF device and PDN gateway 130 is lost, PDN gateway 130 may need to select a new PCRF device. For example, PDN gateway 130 may detect that the selected PCRF device is unavailable by failing to receive a keep-alive packet that may be periodically sent from the selected PCRF device 140. PDN gateway 130 may repeat the process of FIG. 8, with the unavailable PCRF device removed from consideration.

Figure 9:
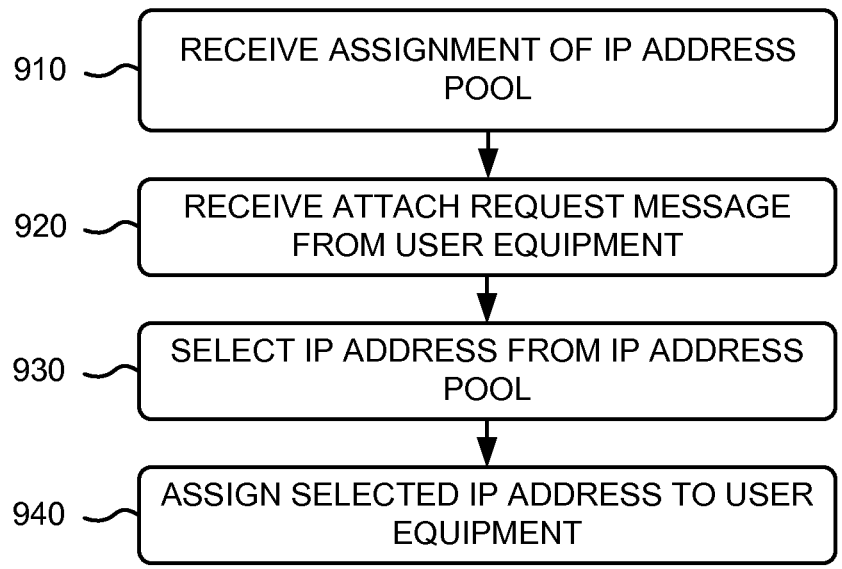
FIG. 9 is a flow diagram illustrating a process for assigning an IP address to a user equipment device according to an implementation described herein.

FIG. 9 is a flow diagram illustrating a process for assigning an IP address to a UE device according to an implementation described herein. In one implementation, the process of FIG. 9 may be performed by PDN gateway 130. In other implementations, some or all of the process of FIG. 9 may be performed by another device or a group of devices separate from or including PDN gateway 130.

The process of FIG. 9 may include receiving an assignment of an IP address pool (block 910). For example, PDN gateway 130 may receive a list of IP addresses from an administrator via input device 440. UE manager 520 of PDN gateway 130 may store the received list of IP addresses in IP address pool database 550 by populating IP address fields 710 and setting assignment fields 720 to indicate that the IP addresses are available.

An attach request message may be received from a UE device (block 920). For example, UE device 110 may send an attach request message to MME 310 via eNodeB 305. MME 310 may send a request to create a default bearer to SGW 320 and SGW 320 may forward the request to PDN gateway 130.

An IP address may be selected from an IP address pool (block 930). For example, UE manager 520 may access IP address pool database 550, identify an available address by checking assignment field 720 of IP address pool database 550, and select the available address.

The selected IP address may be assigned to the UE device (block 940). For example, UE manager 520 may set the assignment field 720 of the selected IP address and may record identification information associated with UE device 110 in UE ID field 730.

Figure 10:
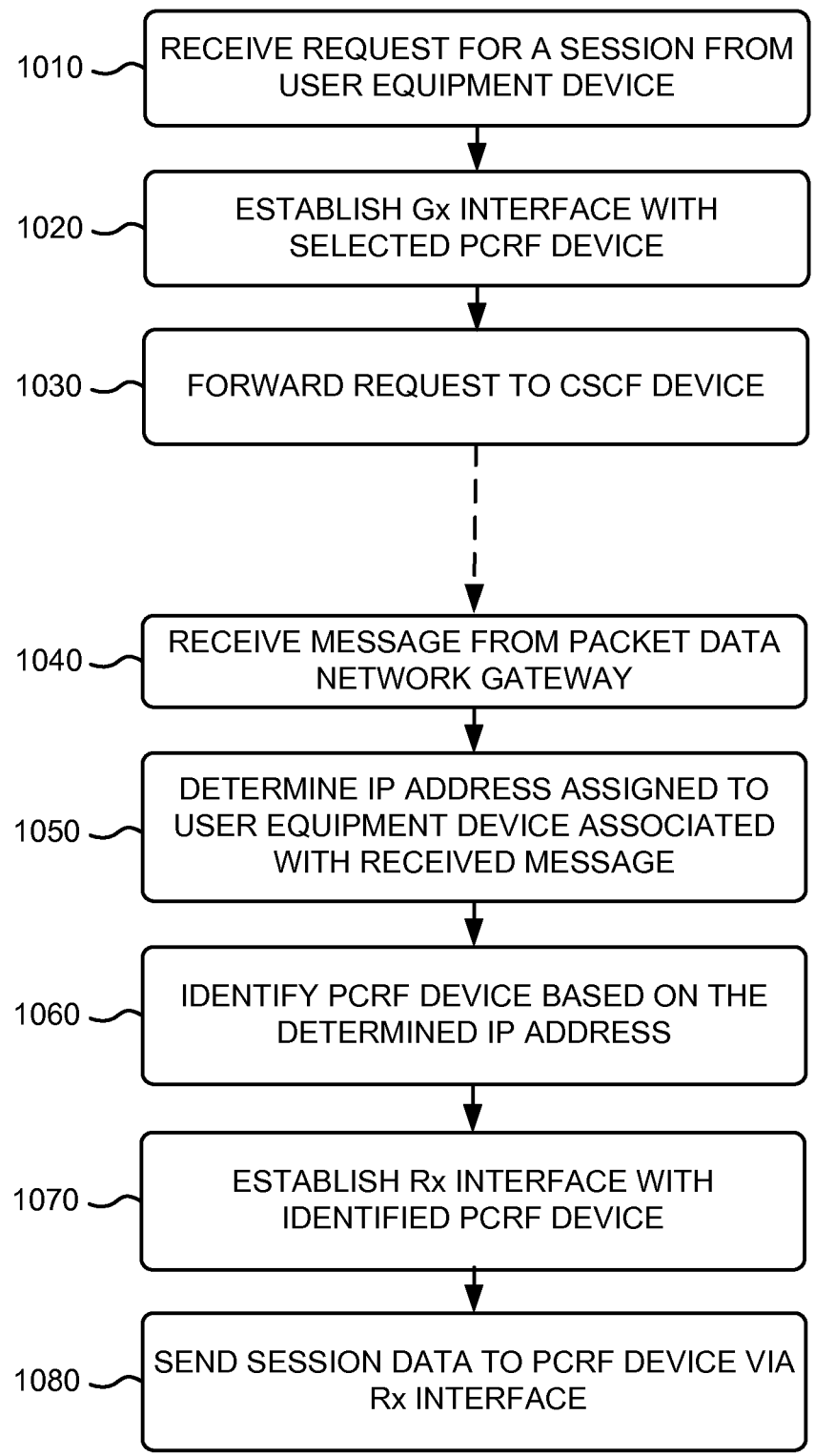
FIG. 10 is a flow diagram illustrating a process for selecting a PCRF by a call session control function device according to an implementation described herein.

FIG. 10 is a flow diagram illustrating a process for selecting a PCRF device according to an implementation described herein. In one implementation, part of the process of FIG. 10 may be performed by PDN gateway 130 and part of the process of FIG. 10 may be performed by CSCF device 150. In other implementations, some or all of the process of FIG. 10 may be performed by another device or a group of devices separate from or including PDN gateway 130 and/or CSCF device 150. The process of FIG. 10 may be used to make sure that PDN gateway 130 and CSCF device 150 select the same PCRF device 140, thus leading to a Gx interface and an Rx interface being established with the same PCRF device 140.

The process of FIG. 10 may include receiving a request for a session from a UE device (block 1010). For example, PDN gateway 130 may receive a request from UE device 110 to activate an application available through IMS network 102. A Gx interface may be established with the selected PCRF (block 1020). For example, PDN gateway 130 may establish a bearer for UE device 110 and may send a Diameter protocol packet that includes a request for a policy and charging control (PCC) rule to the PCRF device 140 that has been previously selected by PDN gateway 130. In response, the selected PCRF device 140 may send a Diameter protocol packet, including a PCC rule, back to PDN gateway 140.

The request from the UE device may be forwarded to a CSCF device (block 1030). For example, PDN gateway 130 may forward a SIP INVITE message from UE device 110 to P-CSCF component 610. The message from the PDN gateway may be received (block 1040). For example, P-CSCF component 610 may receive the message via network interface component 650. P-CSCF component 610 may need to contact PCRF device 140 to provide session information to PCRF device 140, in order for PCRF device 140 to select determine the appropriate PCRF parameters for the particular data flow and forward the PCRF parameters to PDN gateway 130. Thus, P-CSCF component 610 may need to identify a particular PCRF device 140 associated with the received message.

An IP address assigned to a UE device associated with the received message may be determined (block 1050). In one implementation, P-CSCF component 610 may retrieve the IP address of UE device 110 from a SIP message received from UE device 110. In another implementation, P-CSCF component 610 may access a database that associates subscriber identification information with IP addresses. For example, UE manager 520 of PDN gateway 130 may periodically provide information in IP address pool database 550 to CSCF device 150. CSCF device 150 may store the received information in the home subscriber server (HSS) of IMS network 102. For example, as explained above, IP address pool database 550 may associate IP addresses with IMSI numbers of UE devices 110. HSS of IMS network 102 may include a database that associates Mobile Subscriber Integrated Services Digital Network (MSISDN) numbers, which identify telephone numbers of particular subscribers, with IMSI numbers and/or with IP addresses associated with UE devices 110. Thus, P-CSCF component 610 may determine the MSISDN associated with an USE device 110 from the received SIP message and may look up the IP address associated with the MSISDN.

A PCRF device associated with the determined IP address may be identified (block 1060). For example, P-CSCF component 610 may access PCRF database 630 and identify PCRF 140 associated with UE device 110 by matching the IP address of UE device 110 in a particular IP address pool filed 760 with PCRF device 140 identified in the corresponding PCRF ID field 770. In a situation where a particular PCRF device 140 cannot be identified, P-CSCF component 610 may identify the particular PDN gateway 130 associated with UE device 110 by accessing PCRF database 630, and may send a request to the particular PDN gateway 130 for information identifying the particular PCRF device 140 selected by the particular PDN gateway 130.

An Rx interface may be established with the identified PCRF device (block 1070). For example, Rx interface component 640 may generate a Diameter protocol packet to the identified PCRF device 140. Session data may be sent to the identified PCRF via the established Rx interface (block 1080). For example, P-CSCF component 610 may include, in the generated Diameter protocol packet, session information that will allow the PCRF device 140 to select appropriate PCRF parameters and send the Diameter protocol packet to the identified PCRF device 140. The session information may include, for example, QoS requirements and/or charging data associated with the SIP session set up by the P-CSCF component 610.

FIG. 11 is an example of a signal flow according to an implementation described herein. The example of FIG. 11 may include UE device 110 sending a bearer request 1110 to PDN gateway 130. For example, the user of UE device 110 may activate an application that requires communication with IMS network 102. In response to receiving bearer request 1110, PDN gateway 130 may send, via Gx interface component 570, a rule request 1120 to a particular PCRF device 140 that has been selected by PDN gateway 130 based on a particular selection rule. For example, PDN gateway 130 may send rule request 1120 to the nearest PCRF device 140. PCRF device 140 may determine particular PCRF parameters, such as QoS information (e.g., a QoS class identifier), and send policy rules 1130 to PDN gateway 130. PCEF component 530 of PDN gateway 130 may implement the received policy rules and a dedicated bearer may be activated between UE device 110 and PDN gateway 130 (bearer activation 1140). While in the example of FIG. 11, policy rules are pulled from PCRF device 140 via rule request 1120, in other situation, policy rules may be pushed from PCRF device 140 to PDN gateway 130 without a request from PDN gateway 130.

Once a dedicated bearer has been activated, UE device 110 may initiate communication with IMS network 102. For example, UE device 110 may send SIP INVITE message 1150 to P-CSCF component 610 of CSCF device 150. P-CSCF component 610 may access PCRF database 630 to identify PCRF device 140 based on the IP address of UE device 110. Once PCRF device 140 has bee identified by CSCF device 150, CSCF device 150 may send session data 1170 to PCRF 140 via Rx interface component 640. PCRF device 140 may send policy rules 1180 to PDN gateway 130 based on the received session data, and PCEF component 530 of PDN gateway 130 may enforce the received policy rules. For example, PCEF component 530 may change the QoS class identifier of the previously established dedicated bearer to reflect higher QoS requirements of the IMS application activated by UE device 110 via SIP INVITE message 1150. CSCF 150 may send a SIP OK message 1160 to UE device to complete initiation of the session.

In the preceding description, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative, rather than restrictive, sense.

For example, while series of blocks have been described with regard to FIGS. 8-10, the order of the blocks may be modified in other implementations. Further, non-dependent blocks may be performed in parallel.

Also, certain portions of the implementations may have been described as a "component" that performs one or more functions. The term "component" may include hardware, such as a processor, an ASIC, or a FPGA, or a combination of hardware and software (e.g., software running on a processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

It should be emphasized that the term "comprises/comprising," when used in this specification, is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a call session control function (CSCF) device, a request to set up a communication session, the request being associated with a particular user equipment (UE) device;
   determining, by the CSCF device, an Internet Protocol (IP) address associated with the particular UE device;
   identifying, by the CSCF device and based on the IP address, a particular packet data network (PDN) gateway associated with the particular UE device;
   sending, by the CSCF device and to the particular PDN gateway, a request for information identifying a particular policy and a charging rules function (PCRF) device, of a plurality of PCRF devices, associated with the particular PDN gateway;
   receiving, by the CSCF device and from the particular PDN gateway, the information identifying the particular PCRF device;
   establishing, by the CSCF device and based on the information identifying the particular PCRF device, an interface with the particular PCRF device; and
   sending, by the CSCF device and to the particular PCRF device via the interface, session information associated with the communication session.

2. The method of claim 1,
   where the plurality of PCRF devices are associated with an Evolved Packet Core (EPC) network, and
   where the EPC network allows the particular UE device to communicate with an Internet Protocol Multimedia Subsystem (IMS) network.

3. The method of claim 1,
   where identifying the particular PDN gateway includes accessing a PCRF database that associates IP addresses of UE devices with PDN gateways,
   where the UE devices include the particular UE device, and
   where the PDN gateways include the particular PDN gateway.

4. The method of claim 1, where the particular PCRF device is physically closer to the particular PDN gateway than any other PCRF device of the plurality of PCRF devices.

5. A method comprising:
   identifying, by a Packet Data Network (PDN) gateway, a plurality of policy and charging rules function (PCRF) devices of a first network;
   selecting, by the PDN gateway, a particular PCRF device, from the plurality of PCRF devices, that is nearest to the computer system based on a physical distance between the computer system and a geographic location associated with the particular PCRF device or based on a quantity of network nodes between the computer system and the particular PCRF device;
   receiving, by the PDN gateway and from a call session control function (CSCF) device of a second network, a request for information identifying the particular PCRF device selected by the computer system; and
   providing, by the PDN gateway and based on the request, the information identifying the particular PCRF device to the CSCF device.

6. The method of claim 5,
   where the first network includes an Evolved Packet Core (EPC) network, and where the PDN gateway is part of the EPC network.

7. The method of claim 5, further comprising:
   detecting that the particular PCRF device is unavailable;
   transmitting a packet to another PCRF device of the plurality of PCRF devices;
   selecting the other PCRF device based on an amount of time for the packet to reach the other PCRF device; and
   providing information identifying the other PCRF device to the CSCF device.

8. The method of claim 5, further comprising:
   detecting that the particular PCRF device is unavailable;
   selecting another PCRF device, of the plurality of PCRF devices based on a historical usage of computation resources of particular ones of the plurality of PCRF devices; and
   providing information identifying the other PCRF device to the CSCF device.

9. The method of claim 5, where the second network includes an Internet Protocol Multimedia Subsystem (IMS) network.

10. The method of claim 5, further comprising:
    receiving a plurality of IP addresses;
    receiving an attach request message from a particular user equipment (UE) device;
    selecting an IP address from the plurality of IP addresses; and
    assigning the IP address to the particular UE device.

11. The method of claim 5, where identifying the plurality of PCRF devices includes receiving a list identifying the plurality of PCRF devices.

12. The method of claim 5, where identifying the plurality of PCRF devices includes performing network discovery in the first network to identify the plurality of PCRF devices.

13. The method of claim 5, further comprising:
detecting that the particular PCRF device is unavailable;
selecting another PCRF device from the plurality of PCRF devices; and
providing information identifying the other PCRF device to the CSCF device.

14. A system comprising:
a packet data network (PDN) gateway, in a first network, to:
identify a plurality of policy and charging rules function (PCRF) devices in the first network,
select a particular PCRF device, from the plurality of PCRF devices, that is nearest to the first device based on at least one of:
a physical distance between the first device and a geographic location associated with the particular PCRF device, or
a quantity of network nodes between the first device and the particular PCRF device,
receive, from a call session control function (CSCF) device of a second network, a request for information identifying the particular PCRF device selected by the PDN gateway, and
provide, based on the request, the information identifying the particular PCRF device to the CSCF device.

15. The system of claim 14,
where the first network includes an Evolved Packet Core (EPC) network,
and
where the second network includes an IP Multimedia Subsystem (IMS) network.

16. The system of claim 14, where the CSCF device is to:
receive a request to set up a communication session, and
send, to the particular PCRF device, information associated with the communication session over an Rx interface.

17. A system comprising:
a call session control function (CSCF) device to:
receive a request to set up a communication session,
the request being associated with a particular user equipment (UE) device;
determine an Internet protocol (IP) address associated with the particular UE device;
identify, based on the IP address, a particular packet data network (PDN) gateway associated with the particular UE device;
send, to the particular PDN gateway and from the CSCF device, a request for information identifying a particular policy and a charging rules function (PCRF) device associated with the particular PDN gateway;
receive, from the particular PDN gateway, the information identifying the particular PCRF device; and
send, based on the information identifying the particular PCRF device, information associated with the communication session to the particular PCRF device.

18. The system of claim 17, where a quantity of network nodes between the particular PCRF device and the particular PDN gateway is fewer than a quantity of nodes between any other PCRF device of the plurality of PCRF devices and the particular PDN gateway.

19. A non-transitory computer-readable medium storing instructions, the instructions comprising:
one or more instructions that, when executed by at least one processor of a call session control function (CSCF) device, cause the at least one processor to:
receive a request to set up a communication session,
the request being associated with a particular user equipment (UE) device;
determine an Internet Protocol (IP) address associated with the particular UE device;
identify, based on the IP address, a particular packet data network (PDN) gateway associated with the particular UE device;
send, from the CSCF device and to the particular PDN gateway, a request for information identifying a particular policy and a charging rules function (PCRF) device, of a plurality of PCRF devices, associated with the particular PDN gateway;
receive, from the particular PDN gateway, the information identifying the particular PCRF device; and
send, based on the information identifying the particular PCRF device, information associated with the communication session to the particular PCRF device.

20. The non-transitory computer-readable medium of claim 19, where particular PCRF device is physically closer to the particular PDN gateway than any other PCRF device of the plurality of PCRF devices.

\* \* \* \* \*